United States Patent [19]

Characklis

[11] Patent Number: 4,561,981

[45] Date of Patent: Dec. 31, 1985

[54] TREATMENT OF FOULING WITH MICROCAPSULES

[76] Inventor: William G. Characklis, 516 W. Cleveland, Bozeman, Mont. 59715

[21] Appl. No.: 574,455

[22] Filed: Jan. 27, 1984

[51] Int. Cl.$^4$ ............................................... C02F 5/08
[52] U.S. Cl. ................................ 210/696; 134/22.11; 134/42; 210/697; 210/698; 210/764; 252/180; 252/387; 428/402.2; 424/19; 422/7; 422/14
[58] Field of Search ............. 71/67; 106/14.05, 14.11, 106/14.34, 14.41, 16; 210/696–701, 764, 638, 643, 644; 252/175, 176, 180, 181, 388, 387; 428/402.2, 402.21, 402.22; 134/8, 22.11, 42; 166/244 C; 422/7, 14; 424/19, 22, 34, 37

[56] References Cited

U.S. PATENT DOCUMENTS

| | | | |
|---|---|---|---|
| 2,795,560 | 6/1957 | Williams | 252/387 |
| 3,470,001 | 9/1969 | Koury | 106/2 |
| 4,172,119 | 10/1979 | Kuchner et al. | 424/34 |
| 4,244,836 | 1/1981 | Frensch et al. | 252/388 |
| 4,251,386 | 2/1981 | Saeki et al. | 252/388 |
| 4,253,877 | 3/1981 | Miale et al. | 106/208 |
| 4,324,767 | 4/1982 | Dines | 210/638 |
| 4,376,113 | 3/1983 | Suglia et al. | 424/34 |
| 4,396,670 | 8/1983 | Sinclair | 428/321.5 |
| 4,409,156 | 10/1983 | Hoshi et al. | 252/388 |
| 4,500,494 | 2/1985 | Scher | 428/402.21 |

*Primary Examiner*—Peter Hruskoci
*Attorney, Agent, or Firm*—Richard C. Conover

[57] ABSTRACT

A method for controlling, preventing, or removing fouling deposits comprising microencapsulating fouling control chemicals in a slow release capsule. The microcapsules are applied to the substrate to be treated, where they stick to the substrate and slowly release the active treating agents.

5 Claims, No Drawings

TREATMENT OF FOULING WITH MICROCAPSULES

BACKGROUND OF THE INVENTION

The present invention relates to a method for preventing, removing, or controlling fouling deposits.

Fouling deposits build up on equipment surfaces, reducing performance of the equipment. An example of this is corrosion of pipelines, storage tanks, and the like, in which chemicals such as hydrocarbons are stored or transported. Another example is corrosive attack and change of appearance of metals and alloys as a result of protracted exposure to atmospheric weather and other environments. Yet another example is accumulation of biological slime on heat transfer surfaces or in pipelines.

In the case of pipelines used for transporting chemicals, internal corrosion often is worst on the bottom of lines where water and soil particles may accumulate. With respect to transport of petroleum liquids by pipepline, it is virtually impossible to keep water out of the liquid, as water can enter the system wherever there is exposure to the atmosphere, such as in storage tanks. In the case of crude oils, it is not practical or economic to remove all of the water from the oil before transmitting it to the refinery.

To prevent such corrosion, it is desirable that a relatively high concentration of a suitable corrosion inhibitor be present at the points where water and scale particles tend to accumulate. By and large, it is not practical to accomplish this result merely by adding an inhibitor in conventional liquid or powdered from to the oil in the pipeline. If conventional oil soluble inhibitors are used, they would remain in the oil phase and not pass into the water phase. If conventional water soluble inhibitors were added to the oil, they would remain dispersed in the oil phase and would enter the separated water phase only to a small extent if at all.

Exterior coatings on metals and alloys to protect from corrosion and fouling are also impractical, as the coatings are not permanent and often mask the desired properties of the substrate coated.

In the case of biological slime building up on equipment surfaces, chemicals such as chlorine or non-oxidizing biocides are fed into process water to remove fouling deposits. Because of mass transport limitations in the liquid phase or reaction limitations, much of the chemical is consumed by reactions in the fluid phase before it can react with the deposit. In some case, particularly with chlorine addition, some of the chemical is flashed off and is thus wasted. These processes waste chemicals or release much of the chemical to the environment, both of which are undesirable. Problems of this type discourage use of certain chemicals in such applications even though they may be very effective in removing or preventing the fouling deposit.

A number of different methods have been devised to deal with this problem, although none of them has been entirely successful.

Williams, in U.S. Pat. No. 2,795,560, discloses a method for preventing corrosion in the pipelines transporting petroleum products by introducing a plurality of solid pellets containing a water soluble, oil insoluble corrosion inhibitor within the pipeline. These pellets travel along with the fluid, and have a density greater than the hydrocarbon fluid and at least as great as water.

Fuchs, in U.S. Pat. No. 3,338,670, discloses a class of polyphosphate glasses which have both metal corrosion-inhibiting properties and calcium sequestering properties, and which have a controlled rate of dissolution in aqueous solutions. These glasses can be added to aqueous solutions to minimize corrosion and scaling.

Breton, in U.S. Pat. No. 3,205,566, discloses corrosion inhibited metal-glass compositions which are primarily metallic in appearance and properties, but which are inhibited against corrosion by intimate association with a moisture-leachable glass which, during its slow dissolution, releases corrosion-inhibiting substances.

Koury, in U.S. Pat. No. 3,470,001, discloses a gel-like composition which encapsulates essential ingredients such as corrosion inhibitors. This gel can be used as a protective coating for a metallic surface.

Miale et al., in U.S. Pat. No. 4,253,877 disclose a method for controlling fouling in marine substrates by painting the substrate with a paint containing microencapsulated anti-fouling agents.

SUMMARY OF THE INVENTION

Fouling control chemicals can be encapsulated in a slow release microcapsule so that the chemical can be slowly released to the system in the appropriate quantity and at the appropriate site.

The capsular material may be composed of any material compatible with the control chemical, with the proviso that the capsule surface can stick to the fouling deposit site. The sticking ability can be measured by the sticking efficiency, i.e., the number of capsules sticking to the surface divided by the number of capsules striking the fouled surface. The number of capsules striking the surface per unit time will depend on the fluid flow regime (e.g., laminar or turbulent) and the properties of the capsule, such as diameter, specific gravity, shape. Sticking efficiency will be dependent on flow regime, capsule properties, and deposit properties as well as fluid properties.

By applying these fouling control chemicals in the form of a microcapsule, the chemical is transported to the reaction sites where it will be most effective without its decay or removal by undesirable side reactions in the fluid phase. When the capsule absorbs to (or absorbs in) the fouling deposit, the chemical will be released in the fouling deposit. In this matter, very little residual treating chemical will become reentrained in the bulk fluid phase where it will be either consumed by undesirable side reactions or transported to the environment.

This method of dealing with fouling will result in significantly lower requirements of a given chemical treating agent to solve a given fouling problem, as it eliminates the wasteful side reactions which occur when the chemical is merely dumped into the fluid milieu. The treatment chemical will be protected by the microcapsule until it reaches the desired reaction site. This method also significantly reduces the amount of undesirable chemical introduced to the natural environment.

For each application, the capsules must be engineered to maximize their sticking efficiency to the specific deposit. Sticking efficiency can be defined as follows:

$$\text{Sticking efficiency} = \frac{\text{no. of particles sticking at the surface}}{\text{no. of particles striking the surface}}$$

The sticking efficiency is influenced by the microcapsule properties, including the specific gravity, shape, and diameter, because these factors influence the transport rate of the microcapsule to the surface and, therefore, its impact force. Sticking efficiency is also influenced by the fluid flow regime because this also influences transport of the microcapsule to the surface. The sticking efficiency will also be influenced by the surface to which the capsule is to stick, i.e., clean metal, scale deposit surface, fouling biofilm surface etc.

The capsules will require different properties, depending on whether they are used to control biofouling, scaling, or corrosion. Thus, the capsules will have to be engineered differently for different applications. In general, the capsules range from about 0.5 to about 200 micrometers in diameter, with specific gravities greater than the suspending fluid (generally water).

The capsules of this invention do not depend on any type of phase separation, such as oil-water separation, to effect proper performance. The capsules work effectively irrespective of specific system geometry.

DETAILED DESCRIPTION OF THE INVENTION

A great variety of chemicals can be used in the present invention for controlling fouling deposits in systems. The following list of materials suitable for inclusion in capsules according to the present invention is not an exhaustive list, but is merely an illustration of the types of compounds that can be used in the present invention.

SCALING AND GENERAL DEPOSIT CONTROL

Flocculants
Dispersants (e.g., lignosulfonates)
Surfactants
Chelating agents (e.g., EDTA, NTA)
Sequestrants (e.g., polyphosphates)
Scale control (e.g., polyacrylates, polymethacrylates, maleic anhydride copolymers, phosphonates)

BIOLOGICAL FOULING

Oxidizing biocides (e.g., chlorine, hypochlorites, chloroisocyanurates, chlorine dioxide, ozone, hypobromite, bromine, bromo-chloro dimethyl hydantoin, haloamines) Non-oxidizing biocides (e.g., glutaraldehyde, chlorinated phenolics, organo-tin compounds, organo-sulfur compounds, methylene bisthiocyanate, quaternary ammonium salts, acrolein, copper salts, rosin amine salts, beta amines, beta diamines, bis(trichloromethyl) sulfones, beta bromo beta-nitrostyrene, dodecylguanidine salts
Microoganisms—microorganisms which are antagonistic to fouling organisms

CORROSION

Inorganic Inhibitors
Alkali borates
Alkali chromates
Alkali nitrates
Alkali phosphates
Alkali silicates
Ammonium carbonate
Ammonium hydroxide
Ammonium phosphate
Potassium dichromate
Potassium iodide and iodate
Sodium borate
Sodium chromate
Sodium dichromate
Sodium fluorophosphate
Sodium metasilicate
Sodium molybdate
Sodium nitrate
Sodium phosphate
Sodium silicate
Sodium tungstate
Trisodium phosphate
Organic Inhibitors
Amines
Ammonium thiocyanate
Amyl stearate
Aniline
Anthraquinone
Aromatic amines
Benzoic acid
Benzyl thiocyanate
Diphenylamine
Ethylamine or diethylamine
Glucose
Guanidine or guanidine carbonate
Glucose
Hexamethylene tetramine
Mercaptobenzothiazole
Methyl, ethyl, or propyl substituted dithiocarbamates
Nitrochlorobenzene
Quaternary amines
Succinic acid Any method of preparing the microcapsules which results in microcapsules which stick to the surface to be protected and which slowly leach out the active ingredients can be used.

EXAMPLE I

One type of microcapsules that can be used in the process according to the present invention is a macromolecular membrane of a complex coacervate of gelatin Type A and gum acacia. According to this method, a colloidal solution at elevated temperature is prepared containing gelatin Type A, gum acacia, and water. Next is prepared an emulsion or slurry containing the chemical to be encapsulated, a powdered inorganic substance if the chemical is a liquid, and water. The emulsion or slurry of dispersed chemical is then poured into the colloidal solution of gelatin and gum acacia under constant gentle stirring and allowed to cool slowly to room temperature. During the cooling step, the dispersed chemical is encapsulated by the complex coacervate. After cooling the mixture further at low temperatures, the sedimented microcapsules are washed and then resuspended in water. Cold glutaraldehyde solution is then added to cross-link and stabilize the walls of the microcapsules. The microcapsules are washed and then dried. These microcapsules can then be introduced into a system in which they adhere to the substrate to be protected, and the microcapsules slowly release anti-fouling agent from the microcapsules to provide a long-lasting, concentrated anti-fouling effect. Microcapsules containing, water-immiscible fungicidal, bactericidal, or other biocidal chemicals, as well as corrosion-preventing chemicals, can be prepared by this method.

In this encapsulation method, liquid or solid chemicals can be encapsulated with a macromolecular member of a complex coacervate of gelatin Type A and gum acacia. First, a colloidal solution of gelatin and gum acacia is prepared by mixing from about 0.9 to about 1.1 parts by weight of water with constant stirring at a temperature in the range of about 55° C. to about 60° C.

If the chemical to be microencapsulated is a water-immiscribe liquid, the emulsion of the chemical is prepared by mixing from about 3.9 to about 5.2 parts by volume of the chemical, from about 7.6 to about 7.9 by volume of water, and from about 0.1 to about 10 percent by weight of a suitable emulsifier, such as a finely divided inorganic substance based on the combined weight of the water-immiscible liquid and the water. Suitable finely divided inorganic substances include silica, such as Cab-O-Sil, bentonite, and the like. Depending on the degree of ease with which the water-immiscible chemical is emulsified in water, the finely divided inorganic substance is first mixed either with the water-immiscible liquid or with the water before mixture with the other. Those finely divided substances permit the production of microcapsules of controlled and uniform size. The chemical is then dispersed in the aqueous phase using an homogenizer until the dispersed droplets of the chemical to be encapsulated are of desired size. During the emulsification, the mixture is maintained at an elevated temperature. If the chemical to be encapsulated is a finely-divided water-immiscible solid, a slurry of the chemical is prepared by adding from about 0.9 to about 1.1 parts by weight of water and a dispersing agent such as Tween up to about 0.05 parts by weight, if necessary. This mixture is then stirred gently to form a slurry.

With both the collodial solution of gelatin Type A and gum acacia and the emulsion of slurry of dispersed chemical to be encapsulated at a temperature of above about 50° C. and preferably in the range of about 55° C. to about 60° C., the emulsion of slurry is then poured into the colloidal solution and is allowed to cool slowly to room temperature with constant stirring. During this cooling step, the droplets or particles of chemical are encapsulated by the coalescing complex coacervate. The ratio of emulsion or slurry to colloidal solution can be varied over a wide range to achieve the desired wall thickness of the macromolecular membrane of the complex coacervate. A ratio of about 1 part by volume of emulsion of slurry to about 4 parts by volume of colloidal solution is suitable for preparing microcapsules for use in the present invention.

This type of microcapsule is also well suited to use in aqueous environments where corrosion is a problem, as in heat exchangers. For this type of fouling, the corrosion inhibiting chemical are advantageously incorporated in microcapsules according to the present example. Preferred corrosion inhibiting agents are the inorganic corrosion inhibitors. Of these corrosion inhibitors, potassium and sodium salts have been found to be the most advantageous, particularly sodium nitrate, potassium iodide and potassium iodate. Other corrosion inhibiting compounds that can be used include sodium metasilicate and the sodium fluorophosphates.

EXAMPLE II

Another method for making semipermeable microcapsules for use in the present invention involves a two-step polymerization process using at least two monomers which will polymerize, one of which is soluble in a hydrophobic solvent, the other of which is soluble in a hydrophilic solvent or water. First, a hydrophilic solution is prepared, preferably with water, by dissolving the material to be encapsulated in the water together with a first monomer.

A hydrophobic organic liquid is then prepared which has the following properties. First, the solubility of the second monomer which is to be used in the polymerization should be very high in this hydrophobic organic liquid. Second, the hydrophobic liquid should have a slight affinity for the first monomer. Third, the hydrophobic solvent should be such that the hydrophilic solvent should be such that the hydrophilic solvent, when added to it, will form a good emulsion.

The two solvents are then added together and emulsified, the hydrophilic solvent typically being the discontinuous phase. Emulsification can be accomplished by any one of several desired techniques, usually with the aid of an emulsifying agent. The size of the droplets produced dictates the size of the microcapsules formed.

When the desired droplet size range has been achieved, the second monomer is added to the emulsion, and polymerization, condensation, or polyaddition occurs at the interface of the two-phase system. Because the first monomer, dissolved primarily in the discontinuous phase, is slightly soluble in the continuous, hydrophobic organic phase, some diffusion occurs into the continous phase. The microcapsule membrane forms across this interface zone as the polymerization proceeds. The forming membrane limits the further diffusion of the first monomer into the continuous phase, with the membrane characteristics very dependent on the detailed sequence of random encounters between the monomers.

Generally, the membranes produced at this point are macroporous. However, if these raw microcapsules are separated from the continuous phase, resuspended in a quantity of different hydrophobic liquid in which the solubility of the first monomer is greatly reduced, and then exposed again to the second monomer, the same polymerization reaction occurs at a much slower rate over a much narrower interface zone lying only within the interstices of the raw capsule membrane. This results in "patching" of the macroporous defects in the capsule wall, decreasing the pore size and strengthening the membranes.

This type of microcapsule is particularly useful for preparing microcapsules for use in environments where biological fouling occurs. Specific examples of agents that can be used in such microcapsules include copper salts, organotin compounds, quaternnary ammonium compounds, and dodecyl guanidine salts. These compounds encapsulated according to the present example are particularly well suited for use in an aqueous environment where biofouling is a problem such as a heat exchanger.

EXAMPLE III

Another method of making semipermeable microcapsules wherein the porosity of the microcapsules can be controlled is with a polymerization reaction. The permeability of the microcapsules is determined during membrane formation by controlling certain parameters of the interfacial polymerization reaction. A first, hydrophilic monomer capsule of forming a copolymer by polycondensation or polyaddition reaction with a second, hydrophobic, complementary monomer, is dissolved in water together with the material to be encapsulated, and the solution is emulsified within a hydrophobic solvent. When a portion of the complementary monomer is dissolved in the continuous phase of the emulsion, membrane formation begins as interfacial polymerization takes place around the droplets of the discontinuous phase.

The polymerization reaction is allowed to continue only until macroporous, poorly formed capsule membranes are produced, and in a second stage, the affinity of the continuous phase for the first monomer contained in the discontinuous phase droplets is varied by altering the polarity of the continuous phase so that further polymerization occurs preferentially within the macroporous capsule membranes. Finally, the polymerization is terminated when microcapsules of the selected upper limit of permeability have been produced. The technique of varying the affinity of the continuous phase for the monomers dissolved in the discontinuous phase droplets enables one to exercise a degree of control over the thickness of the interface and thus over the site of polymer formation. Further, it allows one to minimize side reactions between continuous phase-solubilized monomers.

The materials chosen for formation of the microcapsules are those which will provide an appropriate sticking efficiency. The sticking efficiency is defined as:

$$\frac{\text{number of particles sticking to the surface}}{\text{number of particles striking the surface}}$$

Obviously, the microcapsules are engineered to maximize the sticking efficiency to the specific deposit or substrate to be protected. The sticking efficiency is influenced by the microcapsule properties, including specific gravity, diameter, and shape, because these factors influence the transport rate of the microcapsule to the surface to be treated, and therefore its impact force.

The microcapsules require different properties depending on whether they are being used to control biofouling, scaling, or corrosion. The capsules are engineered differently for different applications. Preferred sizes for the microcapsules, however, are on the order of 0.5 to 200 micrometers in diameter, and the specific gravity is generally greater than the suspending fluid.

What is claimed is:

1. A method for removing and/or inhibiting fouling deposited on an inner wall of a pipeline for transporting a fluid stream comprising the steps of:

selecting microcapsules, said microcapsules having a specific gravity greater than said fluid stream which have an anti-fouling material encapsulated therein;

the microcapsules being constructed of a semipermeable membrane material which slowly releases the anti-fouling material and which material adheres selectively to the fouling deposited on the inner wall of the pipeline and introducing an effective amount of the microcapsules into the fluid stream;

causing the microcapsules to adhere to the fouling deposited on the inner wall and slowly releasing the anti-fouling material to remove and/or inhibit fouling deposited on the inner wall.

2. The method of claim 1 wherein the fouling is selected from the group consisting of corrosion, biofouling deposits, and scaling deposits.

3. The method of claim 1 wherein the anti-fouling material is selected from the group consisting of scaling control chemicals and biological fouling control chemicals.

4. The method of claim 1 wherein the microcapsule comprises a gelatin-gum acacia material.

5. A method for preventing fouling deposited on an inner wall of a pipeline for transporting a fluid stream comprising the steps of:

selecting microcapsules which have an anti-fouling material incapsulated therein, said microcapsules having a specific gravity greater than said fluid stream;

the microcapsules being constructed of a semipermeable membrane material which slowly releases the anti-fouling material and which material adheres selectively to the inner wall of the pipeline; and introducing an effective amount of the microcapsules into the fluid stream;

causing the microcapsules to adhere to the inner wall and slowly releasing the anti-fouling material to prevent the formation of fouling on the inner wall.

* * * * *